United States Patent [19]

Rex et al.

[11] Patent Number: 4,808,257

[45] Date of Patent: Feb. 28, 1989

[54] TREAD SPLICER

[75] Inventors: William A. Rex, Mogadore; Robert S. Riggs, Stow, both of Ohio

[73] Assignee: The Goodyear Tire & Rubber Company, Akron, Ohio

[21] Appl. No.: 918,353

[22] Filed: Oct. 14, 1986

[51] Int. Cl.$^4$ .............................................. B29D 30/28
[52] U.S. Cl. ..................................... 156/421; 156/413
[58] Field of Search ............... 156/413, 421, 130.3, 156/128.1, 412, 581, 583.91; 100/237

[56] References Cited

U.S. PATENT DOCUMENTS

| | | | |
|---|---|---|---|
| 1,283,337 | 10/1918 | Sikes | 156/421 |
| 1,970,780 | 8/1934 | Stevens | 154/10 |
| 1,996,129 | 4/1935 | Thurman | 156/413 |
| 2,088,889 | 8/1937 | Wikle | 156/421 X |
| 2,955,640 | 10/1960 | Barns | 154/9 |
| 3,067,309 | 12/1962 | Chinn | 100/237 |
| 3,819,449 | 6/1974 | Caretta | 156/413 |
| 4,004,961 | 1/1977 | Takasuga et al. | 156/421 |
| 4,052,246 | 10/1977 | Albaredo et al. | 156/412 |
| 4,057,455 | 11/1977 | Klose | 156/421 X |
| 4,170,509 | 10/1979 | Kubinski | 156/421 X |
| 4,470,866 | 9/1984 | Satoh et al. | 156/406.6 |
| 4,722,132 | 2/1988 | Ciolkevich | 156/421 X |

Primary Examiner—Michael Ball
Assistant Examiner—Ramon R. Hoch
Attorney, Agent, or Firm—T. P. Lewandowski; Frederick K. Lacher

[57] ABSTRACT

A tread splicer (10) including two rows (60,64) of splicing blade assemblies (68) mounted with the blades (76) of one row (60) tilted toward and overlapping the blades (76) of the other row (64). Each of the blade assemblies (68) is operable independently to control the pressure applied to selected portions of the tread ends. Guide rollers (54,56,58) on the tread splicer (10) provide stitching of the tread (14) as well as positioning of the blades (76) relative to the tread (14) and tire building machine drum (18).

5 Claims, 4 Drawing Sheets

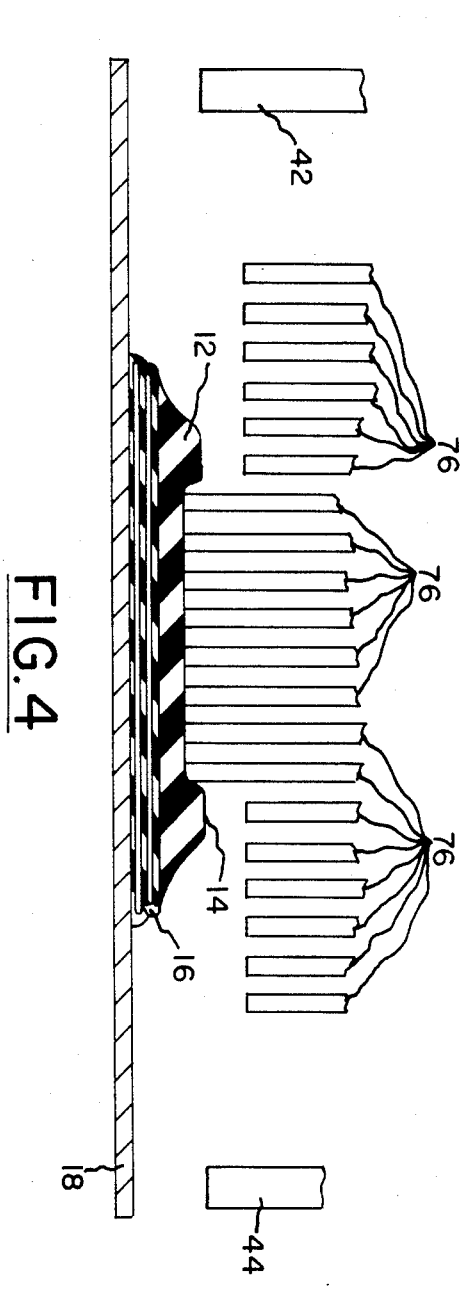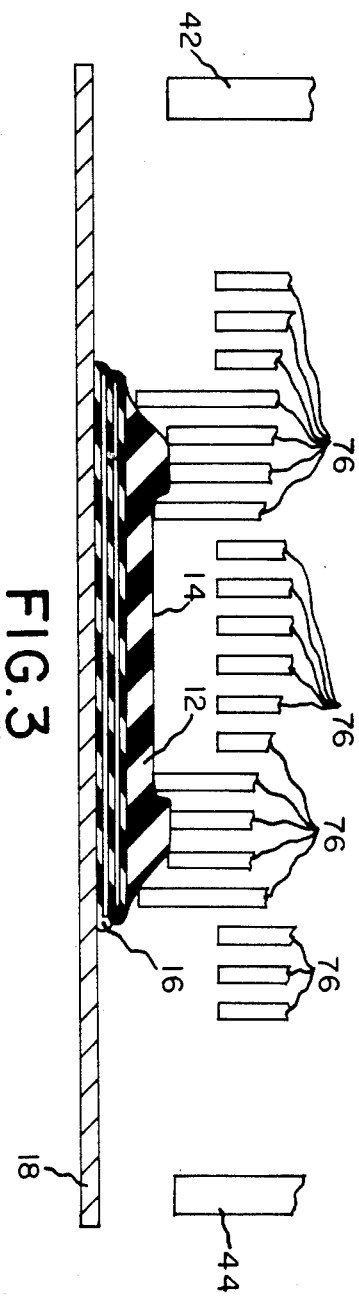

TREAD SPLICER

This invention relates generally, as indicated, to an apparatus for splicing the ends of a strip of uncured rubber or other rubberlike material such as a tire tread on an expandable drum.

Heretofore a tread splicing apparatus has been proposed in which two sets of blades were mounted on a frame with cams and pins for moving one set of blades circumferentially toward the other set as they are pressed radially against the tread ends supported on a rigid anvil. Hollow elastic tubes between the blades and a pressing frame were provided so that the blades could be deflected and assume the profile of the tread. With apparatus of this type, the pressure exerted against the tread on the anvil is not limited because all of the blades are pressed simultaneously against the tread.

In another proposed tread splicer, fingers on a pair of hinged closure members were interleaved to shift the ends of the tread together upon swinging action of the closure members. There was no radial movement of the fingers to stitch the ends nor was there any separate movement of the fingers to control the stitching pressure. In other tread stitchers rollers have been used for stitching the tread to a tire casing; however, the rollers have not always provided the desired pressure for splicing the ends of the treads.

With the apparatus of this invention, multiple blades are provided with separate actuating means and controls to provide pressing action at selected portions of the blades at selected times to obtain the desired stitching action. Rollers are also used for stitching the tread and positioning the tread splicer on the tire casing.

In accordance with an aspect of the invention, there is provided a multiple blade tread splicer for pressing together the ends of a tire tread strip wrapped around tire breaker belts on a tire breaker building drum comprising a frame member for positioning radially outward of the tire breaker building drum, a first row of splicing blade assemblies mounted on a first portion of the frame member, a second row of splicing blade assemblies mounted on a second portion of the frame member at a position spaced from the first portion of the frame member, each of the splicing blade assemblies of the first row and the second row having a splicing blade movable into pressing engagement with the tire tread strip at a location at the ends of the tire tread strip and adjacent a splicing blade in the other row of the splicing blade assemblies, each of the splicing blade assemblies of the first row and the second row having a pressure means for pressing the splicing blade into engagement with the tire tread strip and control means connected to each pressure means to selectively actuate the pressure means for individual separate movement of each of the pressure means to provide movement of the blades individually or with other blades of the blade assemblies of the first row and the second row whereby the desired pressure for application to selected portions of the ends of the tire tread strip is provided to splice the ends together.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of this invention may be employed.

Figure 1:
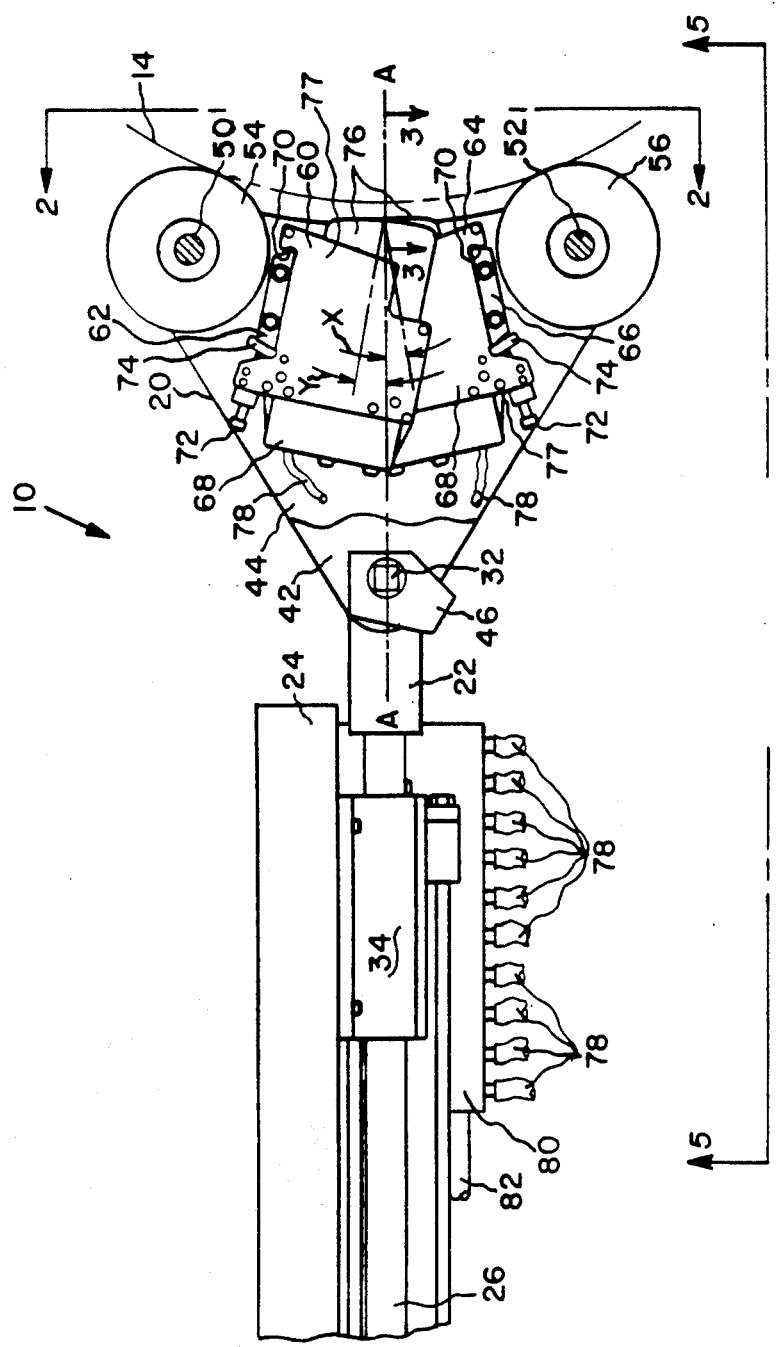
FIG. 1 is a fragmentary side elevation of a tread splicing apparatus embodying the invention with parts being broken away and the surface of the tire tread wrapped on a tire breaker building drum being shown in phantom lines.
Figure 2:
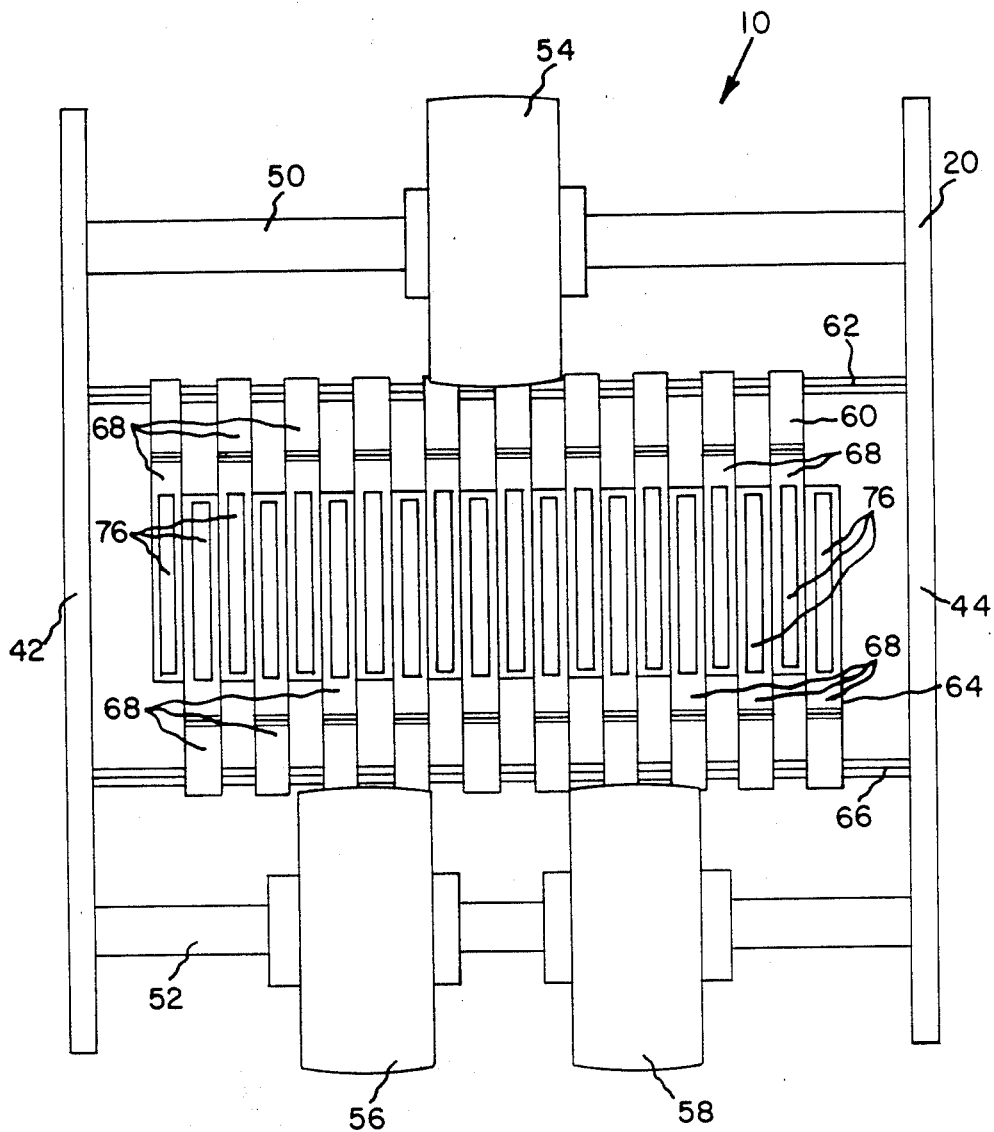
FIG. 2 is an enlarged front elevation taken along line 2—2 in FIG. 1.
Figure 5:
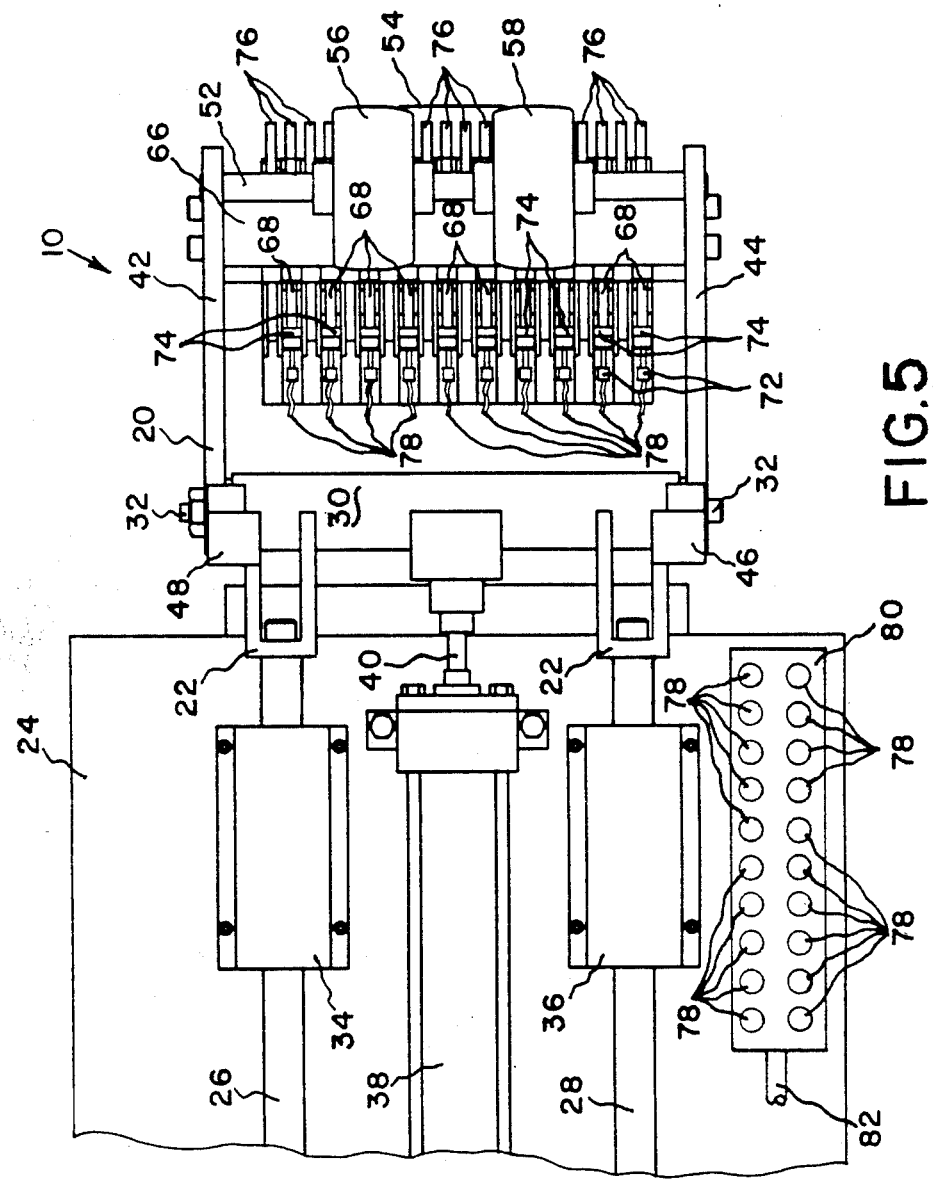
FIG. 5 is a bottom view taken along line 5—5 in FIG. 1 with parts being broken away.
Figure 3:
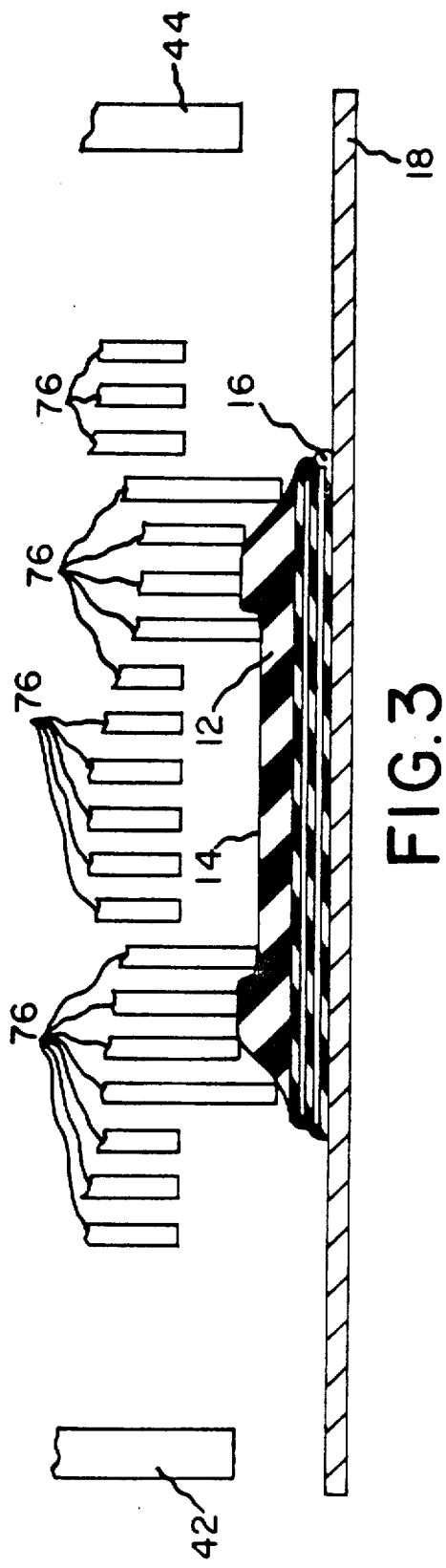
FIG. 3 is an enlarged fragmentary sectional view taken along line 3—3 in FIG. 1 showing a selected group of the blades in engagement with the tread ends of a tread wrapped around the tire breaker building drum.
Figure 4:
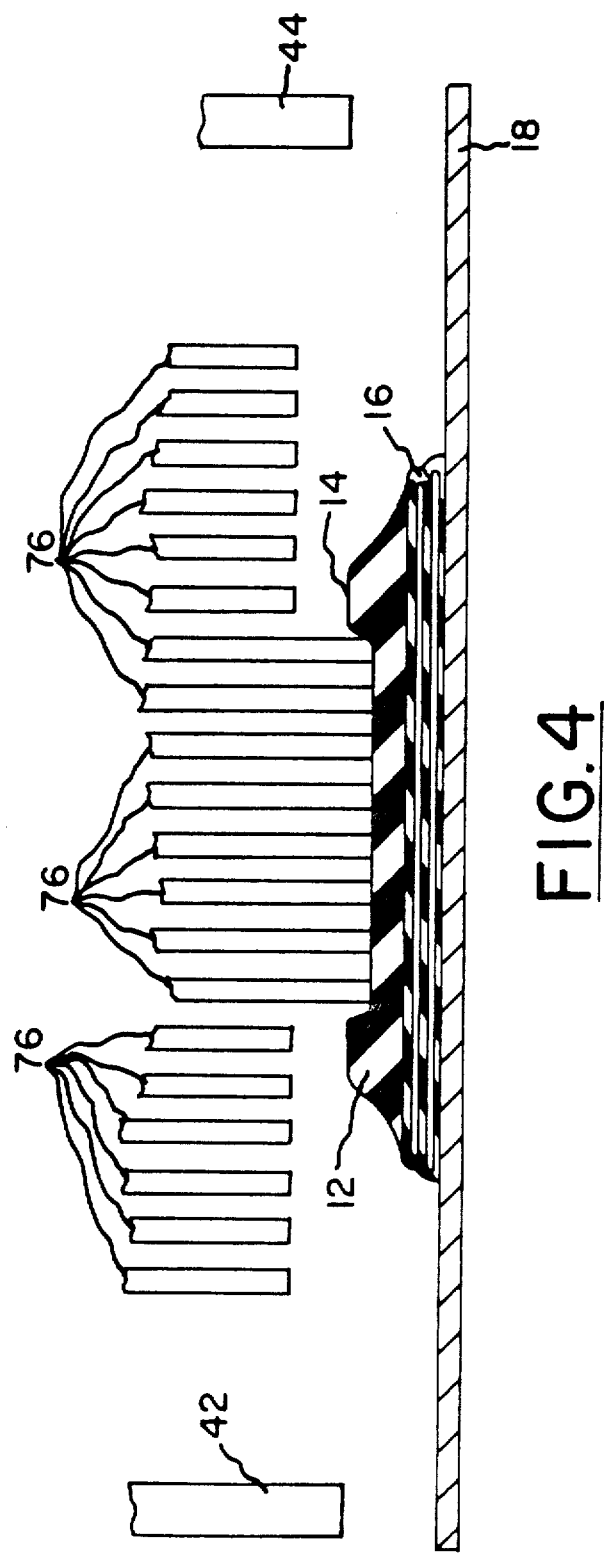
FIG. 4 is a fragmentary sectional view like FIG. 3 showing the blades in a different position.

Referring to FIGS. 1, 2 and 3, a multiple blade tread splicer 10 is shown in position for stitching and splicing a tire tread strip 12 having a tread surface 14 shown in dot-dash lines in FIG. 1. As shown in FIGS. 3 and 4, the tire tread strip 12 may be stitched on tire breaker belts 16 wrapped around a tire breaker building drum 18.

The tread splicer 10 has a frame member 20 pivotally mounted on a supporting carriage member 22 which, in turn, is mounted on part of a tire building machine such as a beam member 24. The supporting carriage member 22 has rods 26,28 fastened to a tubular beam 30 in which a shaft 32 of the frame member 20 is rotatably supported. The rods 26,28 of the supporting carriage member 22 are slidably supported in hangers 34,36 fastened to the beam member 24 containing suitable bearings to facilitate sliding action of the rods and the frame member 20 in a generally radial direction relative to the tire breaker building drum 18. A piston and cylinder assembly 38 may also be mounted on the beam member 24 and have a piston 40 connected to the tubular beam 30 for moving the frame member 20 radially toward or away from the tread surface 14.

The frame member 20 may have side plates 42,44 connected to the shaft 32 for pivotal movement relative to the carriage member 22. Stop plates 46,48 positioned over the shaft 32 between the edges of the side plates and the edges of the supporting carriage members 22 limit the swinging movement of the frame member 20 in the clockwise direction relative to the tubular beam 30.

The side plates 42,44 are connected by an upper shaft 50 and a lower shaft 52. An upper roller 54 is rotatably mounted on the upper shaft 50 at a position generally midway between the side plates 42,44. A pair of lower rollers 56,58 are rotatably mounted on the lower shaft 52 at positions spaced an equal distance from the respective side plates 42,44.

The frame member 20 supports an upper or first row 60 of splicing blade assemblies on a suitable supporting member such as upper dovetail bar 62 extending between and bolted to the side plates 42,44. A lower or second row 64 of splicing blade assemblies is mounted on a suitable supporting member such as a lower dovetail bar 66 extending between and bolted to the side plates 42,44.

Each splicing blade assembly 68 of the first row 60 and second row 64 has a groove 70 for mounting on the upper dovetail bar 62 or lower dovetail bar 66. A screw 72 is threaded in the splicing blade assembly 68 at an edge of the groove 70 and in engagement with a plate 74 for clamping the splicing blade assembly 68 at a desired position along the respective dovetail bar 62 or 66. Each splicing blade assembly 68 has a separate pressure means such as a separate piston and cylinder assembly 77 for individually actuating a splicing blade 76.

In the embodiment shown, the piston and cylinder assembly 77 is pneumatic and connected by an individual air hose 78 to a valve in controls 80 which may be mounted on the beam member 24. The controls 80 may be in communication with a suitable source of air pressure connected to a supply air hose 82. Each splicing blade assembly 68 in the first row 60 is positioned in side-by-side relationship to each splicing blade assembly in the second row 64 of splicing blade assemblies. Accordingly the splicing blade 76 of each splicing blade assembly 68 of the first row 60 is in overlapping relationship with the splicing blade of a splicing blade assembly of the second row 64. Furthermore, the upper dovetail bar 62 is positioned at an angle to the lower dovetail bar 66 so that the splicing blade 76 of each splicing blade assembly 68 in the first row 60 is tilted at an angle of about 20 degrees to the splicing blade of each splicing blade assembly in the second row 64. Preferably, the splicing blade 76 of each splicing blade assembly 68 in the first row 60 is at an angle Y relative to plane A—A extending through the axis of the shaft 32 and the axis of the tire breaker building drum 18. The splicing blade 76 of each splicing blade assembly 68 in the second row 64 is preferably at an angle X relative to the plane A—A as shown in FIG. 1. As stated hereinabove, angles X and Y are ten degrees. The rollers 54,56,58 are preferably positioned so that when they are in the retracted position, the plane A—A will intersect with the center point of each blade 76 as shown in FIG. 1.

In operation, the frame member 20 is moved from a retracted position on the supporting carriage 22 to an extended position as shown in FIG. 1 with the upper roller 54 and lower rollers 56,58 in contact with the tread surface 14 by actuation of the carriage piston and cylinder assembly 38 causing the piston 40 to be extended and move the tubular beam 30 toward the tread surface 14. Each splicing blade 76 of each splicing blade assembly 68 of the first row 60 and second row 64 is in the retracted position as shown in FIG. 1 and therefore upon rotation of the tire breaker building drum 18, the upper roller 54 and lower rollers 56,58 will stitch the tire tread strip 12 onto the tire breaker belts 16. The tire breaker building drum 18 is then stopped at a position with the tread splice under the splicing blade 76 of each splicing blade assembly 68 in the first row 60 and second row 64.

Then, as shown in FIG. 3, the tread splicer controls 80 are actuated in accordance with a predetermined program to communicate air under pressure to a selected number of the splicing blade assemblies 68 in the first row 60 and second row 64. By communicating air under pressure to only a few of the splicing blade assemblies 68, the desired splicing pressure at selected portions of the ends of the tire tread strip 12 is provided while at the same time the total pressure on the tire breaker building drum 18 is limited to prevent damage to the drum. In FIG. 3, the splicing pressure is exerted at the edges of the tread strip 12 and in FIG. 4 the splicing pressure is exerted at the center of the tread strip. Because of the tilting of the splicing blade 76 of each splicing blade assembly 68 in the first row 60 relative to the splicing blade of each splicing blade assembly in the second row 64, the ends of the tire tread strip 12 are urged together in a circumferential direction of the tire breaker belts 16 in addition to being spliced by the radial movement of the splicing blades.

After the ends of the tire tread strip 12 have been spliced by the action of the splicing blade 76 of each splicing blade assembly 68 in the first row 60 and second row 64, the blades are retracted and the frame 20 moved away from the tread surface 14 by retracting the piston 40 of the piston and cylinder assembly 38 of the supporting carriage member 22. The frame member 20 will swing downwardly around the shaft 32; due to gravity however, this movement is limited by the stop plates 46,48. As shown in FIGS. 3 and 4, the first row 60 and second row 64 may be longer than the width of the tire tread strip 12 so that different width tire tread strips may be spliced without changing the tread splicer or tire breaker building drum. All that is required is to program the controls 80 so that each splicing blade assembly 68 which is needed is activated. The amount of force required to splice different tread components varies and with the controls 80 the pressure communicated to each individual splicing blade assembly 68 is regulated to provide the required force. Then the number of splicing blade assemblies 68 to be activated can be limited to prevent damage to the drum 18.

While a certain representative embodiment and details have been shown for the purpose of illustrating the invention, it will be apparent to those skilled in the art that various changes and modifications may be made therein without departing from the spirit or scope of the invention.

What is claimed is:

1. A multiple blade tread splicer for pressing together the ends of a tire tread strip wrapped around tire breaker belts on a tire breaker building drum comprising a frame member for positioning radially outward of said tire breaker building drum, a first row of splicing blade assemblies mounted on a first portion of said frame member, a second row of splicing blade assemblies mounted on a second portion of said frame member at a position spaced from said first portion of said frame member, each of said splicing blade assemblies of said first row and said second row having a splicing blade movable into pressing engagement with said tire tread strip at a location at the ends of said tire tread strip and an overlapping splicing blade in the other row of said splicing blade assemblies, each of said splicing blade assemblies of said first row and said second row having a separate pneumatic cylinder and piston assembly for pressing said splicing blade into engagement with said tire tread strip and control means connected to each said cylinder and piston assembly to limit the number of cylinder and piston assemblies which are actuated to a selected group of said overlapping splicing blade assemblies in said first row and said second row for limiting the pressure of said splicing blades against said drum and to selectively actuate said selected group for individual separate movement of each of said selected group to provide movement of the blades individually and with other blades of said overlapping blade assemblies of said first row and said second row, said control means being operable with said tread splicer in the assembled condition whereby the desired pressure for application to selected portions of said ends of said tire tread strip is provided to splice said ends together.

2. A multiple blade tread splicer in accordance with claim 1 wherein each pneumatic cylinder of each said pneumatic cylinder and piston assembly in said first row of splicing blade assemblies is positioned in side-by-side relationship with each pneumatic cylinder of each said pneumatic cylinder and piston assembly in said second row of splicing blade assemblies.

3. A multiple blade tread splicer in accordance with claim 2 wherein each said splicing blade of each of said splicing blade assemblies in said first row is tilted at an angle of about 20 degrees to said blade of each of said splicing blade assemblies in said second row for simultaneous movement of the blades radially and circumferentially of said building drum to provide engagement of all the blades with said tire tread strip in the area of said ends and in a position for urging said ends together.

4. A multiple blade tread splicer in accordance with claim 1 wherein said frame member is pivotally mounted on a supporting carriage to position said frame and splicing blade assemblies, and said carriage is mounted for movement radially toward and away from said tire breaker building drum.

5. A multiple blade tread splicer in accordance with claim 6 wherein said frame member has spaced-apart guide rollers for engagement with a surface of said tire tread strip to position said frame member with said splicing blade assemblies at a predetermined distance from said tread surface and to stitch said tire tread strip on said tire breaker belts.

* * * * *

UNITED STATES PATENT AND TRADEMARK OFFICE
CERTIFICATE OF CORRECTION

PATENT NO. : 4,808,257

DATED : February 28, 1989

INVENTOR(S) : William A Rex and Robert S Riggs

It is certified that error appears in the above-identified patent and that said Letters Patent is hereby corrected as shown below:

Drawings - Sheet 3 of 4 should be deleted to be replaced with the attached sheet containing Figs 3 and 4.

Column 6, line 8: "claim 6" should read --claim 4--.

Signed and Sealed this

Fifth Day of September, 1989

Attest:

DONALD J. QUIGG

Attesting Officer

Commissioner of Patents and Trademarks